INVENTOR
Karl VÖGTLIN

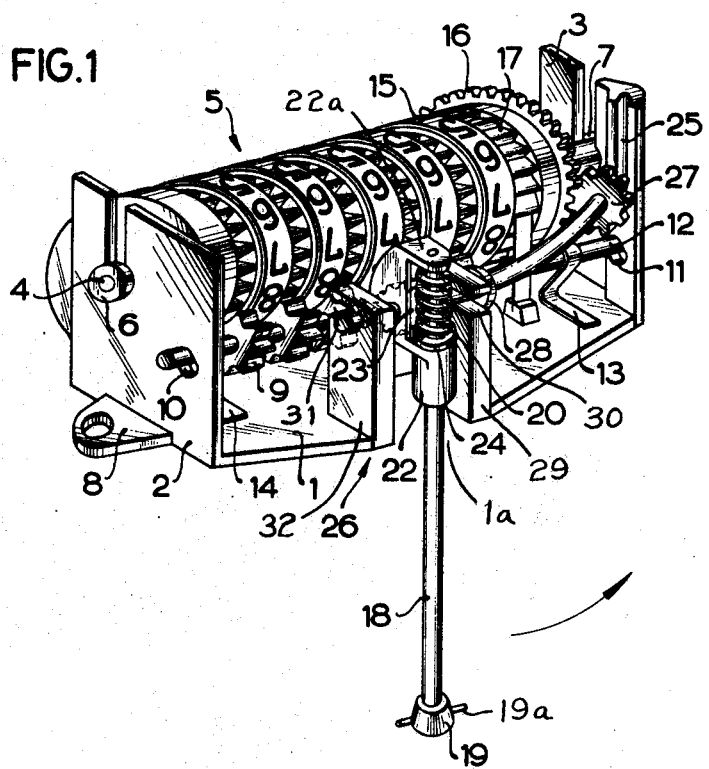

United States Patent Office 3,502,265
Patented Mar. 24, 1970

3,502,265
ANGULAR TRANSMISSION, PARTICULARLY FOR RECORDING INSTRUMENTS
Karl Vögtlin, Villingen, Black Forest, Germany, assignor to Kienzle Apparate G.m.b.H., Villingen, Germany
Filed Jan. 9, 1968, Ser. No. 696,623
Int. Cl. G01c 22/00; G06m 1/04
U.S. Cl. 235—96                                10 Claims

ABSTRACT OF THE DISCLOSURE

A counter is mounted on the hinged cover of a casing in whose main part a drive means is located. An angular transmission connects the counter with the drive means in open and closed positions of the cover, and includes at least one flexible transmission shaft means which is in a resiliently deformed condition to hold itself in bearings.

BACKGROUND OF THE INVENTION

Counters of all kinds are known in which the counter wheel of the lowest order is continuously driven through a transmission by drive means rotating at a speed proportionate to a measured value, such as the distance traveled by a car so that the counter indicates the traveled distance. Since an ordinal set of number wheels of the counter is arranged behind a window in the cover of the casing, the transmission must be constructed to by-pass other components of the instruments located in the casing. It is generally necessary to provide an angular transmission, whose ratio is selected to adapt the number of revolutions of the drive means to the number of revolutions required for the counter wheel of the lowest order of the counter.

The counter axis is generally arranged parallel to the window in the cover of the casing, and an input shaft having a worm gear is driven by the drive means in the main part of the caisng. Due to the required transmission ratio, it is only very rarely possible to arrange the worm gear in a position in which it can directly mesh with a gear driving the counter wheel of the lowest order. Consequently, a transmission shaft is generally provided parallel to the axis of the counter, having gears meshing with the worm gear of the input shaft and with the operating gear of the counter wheel of the lowest order.

Constructive difficulties develop due to the fact that the cover carrying the counter is moved relative to the input shaft carrying the worm gear when the cover is opened or closed.

It is known to provide a flexible drive shaft for counters arranged in a hinged cover so that the driving connection between the drive means and the counter is not interrupted when the cover is opened. A flexible cable, or a shaft made of wires, or a Cardan shaft have been used, but such arrangements are very expensive, and require considerable service and maintenance operations. The assembly is complicated, and unsuitable for mass production of high precision instruments. Furthermore, the known transmissions serving this purpose have to be secured against axial displacement of the shafts which considerably increases the assembly time.

SUMMARY OF THE INVENTION

It is one object of the invention to provide an angular transmission for instruments which include parts mounted on a cover movable relative to a main housing in which other parts are mounted.

Another object of the invention is to provide an inexpensive angular transmission which can be assembled easily and taken apart in a very short time by comparatively unskilled operators.

Another object of the invention is to facilitate the mounting of transmission shafts by making the same flexible and resilient.

Another object of the invention is to produce whole units of a transmission, including shafts and gears as injection molded units.

With these objects in view, the present invention relates to an angular transmission which is used with an instrument casing having a housing part, and a cover mounted on the housing part for angular movement between open and closed positions.

This type of housing is particularly used for speedometers, odometers, tachographs and like recording instruments.

One embodiment of the angular transmission comprises an operating gear mounted on the cover for rotation about a first axis, preferably parallel to the hinge axis of the cover, and adapted to drive a device mounted in the cover, such as a counter having number wheels visible through a window in the cover. Drive means, preferably rotating at a speed proportional to the speed at which a vehicle travels, are mounted in the housing part for rotation about a second axis. Input shaft means have at one end coupling means connected with a drive means for rotation and relative movement during opening and cloing of the cover, and have at the other end a first transmission gear, for example a worm screw, meshing with a corresponding worm gear on a resiliently flexible transmission shaft means which has an output gear meshing with the operating gear of the counter. Mounting means are secured in the cover and have a plurality of bearing means, preferably open slots, for supporting the flexible transmission shaft means for rotation. The bearing means are disposed to resiliently deform the transmission shaft means so that the same is resiliently held in the bearing means during the operation of the counter, but the transmission shaft means can be moved out of the bearings and detached from the mounting means by manual flexing.

Preferably, the transmission shaft means including a shaft, an output gear, a transmission gear, and a flange abutting a wall of the mounting means, is an injection molded unit.

In a modified embodiment of the invention, the bearing means define an axis for a portion of a transmission shaft having an axis slanted to the hinge axis of the cover. In this embodiment, it is advantageous to make the input shaft flexible and resilient, and it is preferred to manufacture input shaft means including coupling means and transmission gear of a flexible resilient material by injection molding.

In the preferred embodiment of the invention, the transmission shaft has a portion mounted in two bearing slots open in opposite directions and carrying the transmission gear. The end of the transmission shaft, which carries the output gear, is guided in a slot extending transverse to the plane of the other bearing slotsa nd substantially parallel to the direction in which the output gear applies force to the operating gear during normal operations. The arrangement is such that the end portion of the transmission shaft is urged into the closed end of the bearing slot by the reaction force opposing the drive force of the output gear.

When the car is reversed, the drive means rotates in opposite direction, the transmission shaft also rotates in opposite direction, and in this event, the output gear rolls on the operating gear of the counter and the end portion of the transmission shaft moves along the bearing slot until the output gear separates from the operating gear of the counter. Of course, when the direction of rotation is again reversed to the normal condition of forward driving, the resilient transmission shaft returns the output gear to its normal position meshing with the operating gear so that the transmission shaft is again placed in the closed end of the bearing slot.

In accordance with the invention, the transmission shaft means operates and rotates in a resiliently deformed condition, and holds itself in open bearing means due to its resilient tension. Consequently, the number of parts of the transmission reduced as compared with the prior art, and the transmission shaft means can be easily assembled by a simple inserting operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary perspective view illustrating an angular transmission according to an embodiment of the invention in combination with a counter;

FIG. 2 is a fragmentary plan view illustrating details of the embodiment of FIG. 1;

DESCRIPTION OF THE PREFERRED EMBODIMENTS

Figure 3:
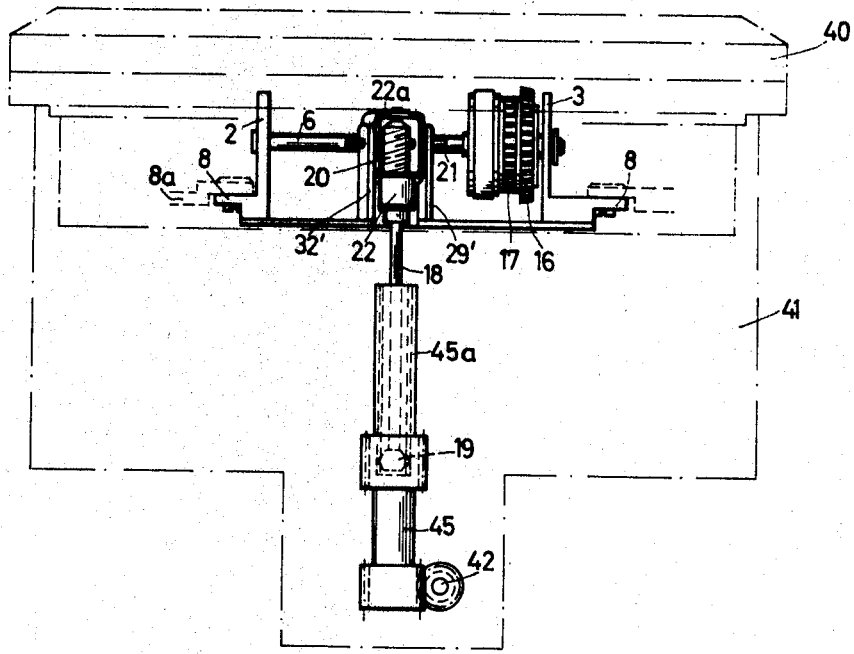
FIG. 3 is an elevation illustrating a modified embodiment of FIGS. 1 and 2 mounted in a casing having a hinged cover shown in closed position.
Figure 4:
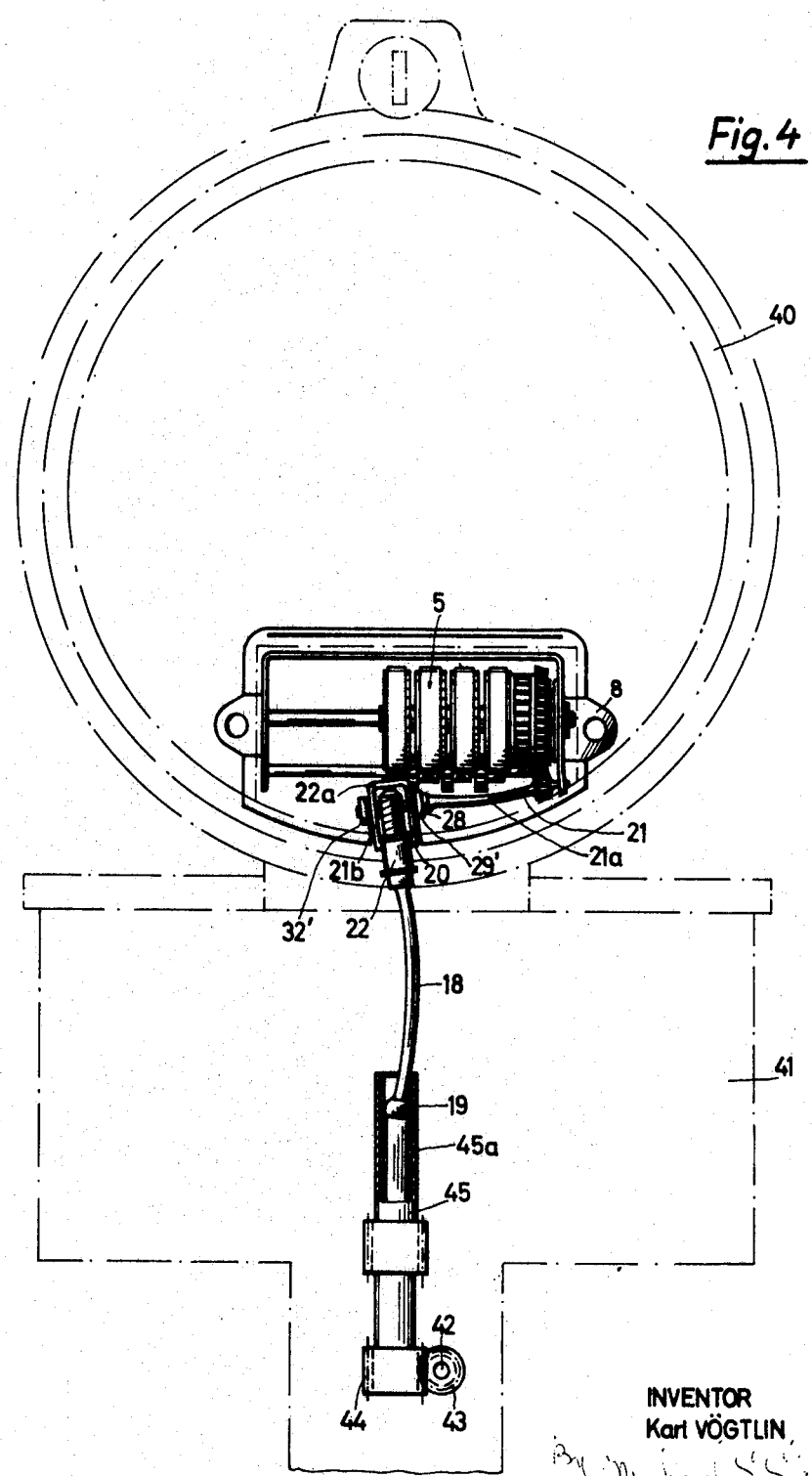
FIG. 4 is an elevation showing the embodiment of FIG. 3 in a position in which the cover of the casing is open.

A mounting means 1 has a bottom wall formed with a cut-out 1a, two upright side walls 2 and 3, and a pair of ears 8 by which the mounting means is secured to brackets 8a in the cover 40 which is hingedly connected for turning movement about a hinge axis to a housing part 41, and can be turned from the closed position shown in FIG. 3 to the open position shown in FIG. 4.

A counter 5 is mounted between the side walls 2 and 3 on a shaft 4 which is located in open slots of walls 2 and 3 and secured against axial movement by a flange 6 and a spring ring 7. Counter 5 includes an ordinal set of counter wheels including number wheels each of which carries ten digits which can be viewed through a window, not shown, in cover 40 in the open and closed positions of the cover, since the counter moves with the cover.

The ordinal gears of the counter cooperate with ordinal tens transfer pinions 9 mounted on a shaft 12 which is guided in parallel slots 10 and 11 of side walls 2 and 3 and urged by leaf springs 13 and 14 to a position in which the tens transfer pinions 9 mesh with the ordinal gears.

The counter wheel 15 of the lowest decimal order is connected for rotation with a ratchet wheel 17 and an operating gear 16. A resilient pawl engages the teeth of ratchet wheel 17 so that counter wheel 15 and operating gear 16 can rotate only in one direction of rotation.

Referring now to FIGS. 3 and 4, a shaft 42 is driven at a speed proportionate to the speed of a car on which the instrument is mounted, and drives through gears 43 and 44, a drive means including a hollow shaft 45 in whose interior two guide slots 45a are located in a common plane.

An input shaft means 18 includes a coupling means 19, see also FIG. 1, having two projecting pins 19a guided in slots 45a, and the shape of the main part of the coupling means is such that shaft 18 can perform angular movements relative to drive shaft 45, and also axial movements. In the position of FIG. 3, the coupling means 19 of input shaft means 18 is fully inserted into the hollow drive shaft 45 since the cover 40 is closed. In the open position of the cover, coupling means 19 is located near to the end of the drive shaft 45a, as shown in FIG. 4. Shaft 18 is shown in FIG. 4 in a curved condition due to the fact that FIG. 4 illustrates a modified embodiment which will be discussed hereinafter. In the embodiment of FIGS. 1 and 2, input shaft 18 will move in straight condition in axial direction of drive shaft 45, but will be required to perform a pivotal movement about the axis defined by pins 19a since its upper end moves along a circle having its center in the hinge axis of cover 40.

A transmission gear shown to be a worm screw 20 is secured to the other end of input shaft 18 and meshes with a worm gear 23 forming an integral part of a flexible transmission shaft means 21 which includes a first shaft portion 21a and a second shaft portion 21b separated from each other by a flange 28, and an output gear 27 meshing with operating gear 16 of the counter wheel 15 of the lowest order of counter 5, as best seen in FIGS. 1 and 2. The entire transmission shaft means 21 including flange 28 and 27 and shaft portion 21b is an injection molded unit consisting of a flexible resilient plastic material.

Bearing means 26 are provided for supporting transmission shaft means 21 and include two walls 29 and 32 which have open bearing recesses 30 and 31 located in a common plane, but opening in opposite directions, as best seen in FIG. 2.

Wall 3 has an elongated bearing slot 25 which extends substantially perpendicularly to the plane of bearing slots 30 and 31 and slidingly receives the end portion 33 of transmission shaft means 21. Since a shoulder of shaft portion 21a abuts the inner surface of wall 3 adjacent groove 25, bearing slot 25 constitutes a thrust bearing sustaining axial forces which are caused by the resilient bending of shaft portion 21a. The resilient tension in shaft portion 21a presses flange 28 against wall 29, and the deformation of transmission shaft means 21 also urges shaft portions 21b to a position abutting the closed ends of bearing slots 30 and 31.

A holding means includes a sleeve 22 mounted on input shaft 18, and a U-shaped bracket having side walls with bearing bores for shaft portion 21b, and a leg 22a with a bore for a pin portion of worm screw 20. Since portions 22, 22a hold input shaft 18, and shaft portion 21b is mounted in the holding means, the worm gear 23 on shaft portion 21b is held in meshing engagement with worm screw 20. A flange 24 on input shaft 18 prevents downward movement of the same relative to sleeve 22.

It will be seen that transmission shaft means 21 can be detached from the mounting means and moved out of the bearing means 31, 30, 25 by manual flexing and pulling, and that transmission shaft means 21 can be inserted into the bearings in a manually flexed condition, and then holds itself resiliently in the bearing, fully capable of transmitting forces between the input shaft means 18 and the operating gear 16. Worm gear 23 is preferably mounted on shaft portion 21b for detachment in axial direction, and connected to shaft portion 21b by suitable flat faces or a key.

Since the greatest bending force acts adjacent flange 28, it is preferred to gradually taper shaft portion 21a from flange 28 toward output gear 27 so that the span of life of the transmission shaft means 21 is increased.

During normal operations, the car moves forward and drive means 45 drives input shaft means 18 at a speed proportionate to the speed of the car so that worm screw 20 drives worm gear 23, transmission shaft means 21 with output gear 27 so that the same drives operating gear 16 by which the counter 5 is operated. The reaction of the counter and of operating gear 16 against the force exterted by the teeth of output gear 27 on the teeth of operating gear 16 acts on shaft portion 21 to bend the same downward so that shaft end portion 33 is located at the closed lower end of bearing slot 25, and gears 27 and 16 continuously mesh.

When the car is reversed, it is not desired to run the counter backward, and consequently rotating in the opposite direction is prevented by the pawl which engages ratchet wheel 17. When operating gear is stopped and blocked in this manner, and transmission shaft means 21 rotated, output gear 27 will roll on operating gear 16 while end portion 33 moves upward in bearing slot 25 which is possible due to the fact that shaft portion 21a is flexible. At a certain point, the teeth of output gear 27 will separate from the teeth of operating gear 16 so that output gear 27 will no longer roll on operating gear 16.

When the car again moves in forward direction, the resiliently flexed shaft portion 21a urges output gear 27 downward into meshing engagement with operating gear 16 so that the forces transmitted between gears 27 and 16 again urge end portion 33 into the lowest position at the closed end of bearing slot 25.

The embodiment illustrated in FIGS. 3 and 4, is constructed as described with reference to FIGS. 1 and 2, and corresponding parts are indicated by like reference numerals.

In order to reduce the bending and deflection of transmission shaft means 21, and particularly of transmission shaft portion 21a, the parallel walls 29', 32' at the mounting means are placed in an oblique position so that the axis defined by the respective bearings in walls 29', 32' is slanted to the hinge axis of cover 40. In the closed position shown in FIG. 3, input shaft 18 will be straight, as in the embodiment of FIGS. 1 and 2. However, when the cover is opened, as shown in FIG. 4, input shaft 18 will be resiliently deformed while its lower end assumes a position in which its axis is slanted to the axis of the drive means 45 which is permitted by the partly spherical shape of coupling means 19. In the closed position of the cover shown in FIG. 3 in which the counter is continuously operated, input shaft 18 is not flexed. Particularly in the embodiment of FIGS. 3 and 4, in which the input shaft is flexed, the input shaft means including coupling means 19 and worm screw 29 are injection molded of a plastic material as a unit.

It will be understood that each of the elements described above, or two or more together, may also find a useful application in other types of angular transmissions differing from the types described above.

While the invention has been illusutrated and described as embodied in an angular transmission used in an instrument casing having a hinged cover and having shaft means made of a resilient flexible plastic material by injection molding, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination with an instrument casing having a housing part and a cover mounted on said housing part for angular movement between open and closed position; an angular transmission comprising an operating gear mounted on said cover for rotation about a first axis and adapted to drive a device mounted on said cover; drive means mounted in said housing part for rotation about a second axis which crosses said first axis and spaced from the same in said open and closed positions of said cover; input shaft means having at one end coupling means connecting said input shaft means with said drive means for rotation and for relative movement during opening and closing of said cover, and having at the other end a first transmission gear; resiliently flexible transmission shaft means having an output gear meshing with said operating gear, and spaced from said output gear a second transmission gear meshing with said first transmission gear; and mounting means secured in said cover and having a plurality of bearing means for supporting said flexible transmission shaft means for rotation, and being disposed to resiliently deform said transmission shaft means so that the same is resiliently held in said bearing means during operation and can be moved out of said bearing means and detached from said mounting means by manual flexing.

2. Angular transmission as claimed in claim 1 wherein said transmission shaft means is a flexible resilient injection molded unit.

3. Angular transmission as claimed in claim 1 wherein said mounting means include a wall; wherein said transmission shaft means includes a flange resiliently abutting said wall; and wherein one of said bearing means is a thrust bearing so that said transmission shaft means is resiliently bent between the same and said flange.

4. Angular transmission as claimed in claim 1 wherein said bearing means include two walls having bearing recesses open in opposite directions, and a third wall having a bearing means supporting one end of said transmission shaft means.

5. Angular tranmission as claimed in claim 4, wherein said mounting means include a third wall having a bearing slot closed at one end, receiving one end portion of said transmission shaft means, and forming a thrust bearing; wherein said output gear is secured to said one end portion; wherein said output gear and said operating gear are located adjacent said third wall; wherein said bearing slot extends substantially parallel to the direction in which force is transmitted from said output gear to said operating gear so that said end portion is urged into the closed end of said bearing slot during operation in one direction of rotation.

6. Angular transmission as claimed in claim 5 comprising means for blocking rotation of said operating gear in the opposite direction of rotation so that said output gear rolls along the periphery of said operating gear so that said end portion moves away from said closed end of said bearing slot while said transmission shaft means is resiliently flexed until said output gear separates from said operating gear.

7. Angular transmission as claimed in claim 1 comprising a holding means secured to said input shaft and having bores through which said transmission shaft means passes so that said first and second transmission gears are held in meshing engagement; and wherein said mounting means include a bearing block including two walls between which said holding means is located and having two of said bearing means, and a third wall having a bearing slot extending substantially parallel to the direction in which force is transmitted from said output gear to said operating gear and having a closed end, one end portion of said transmission shaft means being guided in said bearing slot so that said end portion is urged by the reaction to said force into the closed end of said bearing slot during operation in one direction of rotation.

8. Angular transmission as claimed in claim 1 wherein said mounting means include three spaced walls, two of said walls being located on opposite sides of said transmission gears and having bearing means for a straight portion of said transmission shaft means, and the third wall having a bearing means for one end portion of said transmission shaft means and disposed so that the portion of the same located between said third wall and one of said two walls is resiliently flexed and curved.

9. Angular transmission as claimed in claim 1 wherein said device comprises a counter having a plurality of ordinal wheels, the wheel of the lowest order being secured to said operating gear so that said counter is driven by the same; and wherein said drive means include means connected to a part moving at a speed proportionate to the distance travelled by a vehicle supporting said casing so that said counter indicates the distance travelled by the vehicle.

10. Angular transmission as claimed in claim 1 wherein said cover is mounted on said housing part for turning movement about a hinge axis; wherein said mounting means has bearing means disposed for supporting the portion of said transmission shaft means which carries said second transmission gear, for turning movement about an axis slanted to said hinge axis; and wherein said input shaft means is a flexible resilient injection molded unit which is resiliently deformed during opening and closing of said cover.

References Cited

UNITED STATES PATENTS

| 1,841,318 | 1/1932 | Earnest | 235—96 |
| 1,848,061 | 3/1932 | Helgeby | 235—96 X |
| 1,872,288 | 8/1932 | Helgeby | 235—96 X |
| 2,046,163 | 6/1936 | Helgeby | 235—96 X |

OTHER REFERENCES

German printed application 1,089,982, Sept. 29, 1960, Vogtlin, 42d 1/01.

RICHARD B. WILKINSON, Primary Examiner

STANLEY A. WAL, Assistant Examiner

U.S. Cl. X.R.

235—91